United States Patent Office

3,164,453
Patented Jan. 5, 1965

3,164,453
WATER REMOVAL FROM GAS MIXTURES
Robert M. Milton, Buffalo, N.Y., assignor to Union Carbide Corporation, a corporation of New York
Filed Dec. 18, 1959, Ser. No. 860,599
3 Claims. (Cl. 55—35)

This invention relates to a method for adsorbing fluids and separating a mixture of fluids into its component parts. More particularly, the invention relates to a method of adsorbing water with adsorbents of the molecular sieve type. Still more particularly, the invention relates to a method for preferentially adsorbing water from a vapor mixture containing at least one member selected from the group consisting of olefinic and normal saturated aliphatic hydrocarbons containing less than four carbon atoms per molecule, air, nitrogen and hydrogen.

The present process is advantageous in drying vapor-mixtures, for example, in drying natural gas so as to prevent hydrate formation in pipelines, thereby avoiding corosion problems. This process may also be used to dry cracked gas containing mainly light olefins to prevent clogging of liquid-gas contact means in the low temperature column used to recover ethylene.

Broadly, the invention comprises mixing molecules, in a fluid state, of the materials to be adsorbed or separated with at least partially dehydrated crystalline synthetic metal-aluminum-silicates, which will be described more particularly below, and effecting the adsorption of the adsorbate by the silicate. The synthetic silicate used in the process of the invention is in some respects similar to naturally occurring zeolites. Accordingly, the term "zeolite" would appear to be appropriately applied to these materials. These are, however, significant differences between the synthetic and natural silicates. To distinguish the synthetic material used in the method of the invention from the natural zeolites and other similar synthetic silicates, the sodium-aluminum-silicate and its derivatives taugh hereinafter to be useful in the process of the invention will be designated by the term "zeolite A." While the structure and preferred method of making zeolite A will be discussed in some detail in this application, additional information about the material and its preparation may be found in an application filed December 24, 1953, Serial No. 400,388, now U.S. Patent No. 2,882,243, having issued April 14, 1959, in the name of R. M. Milton.

It is the principal object of the present invention to provide a process for the selective adsorption of molecules from fluids. A further object of the invention is to provide a method whereby certain molecules may be adsorbed and separated by crystalline synthetic metal-aluminum-silicate from fluid mixtures of those molecules and other molecules.

Figure 1:
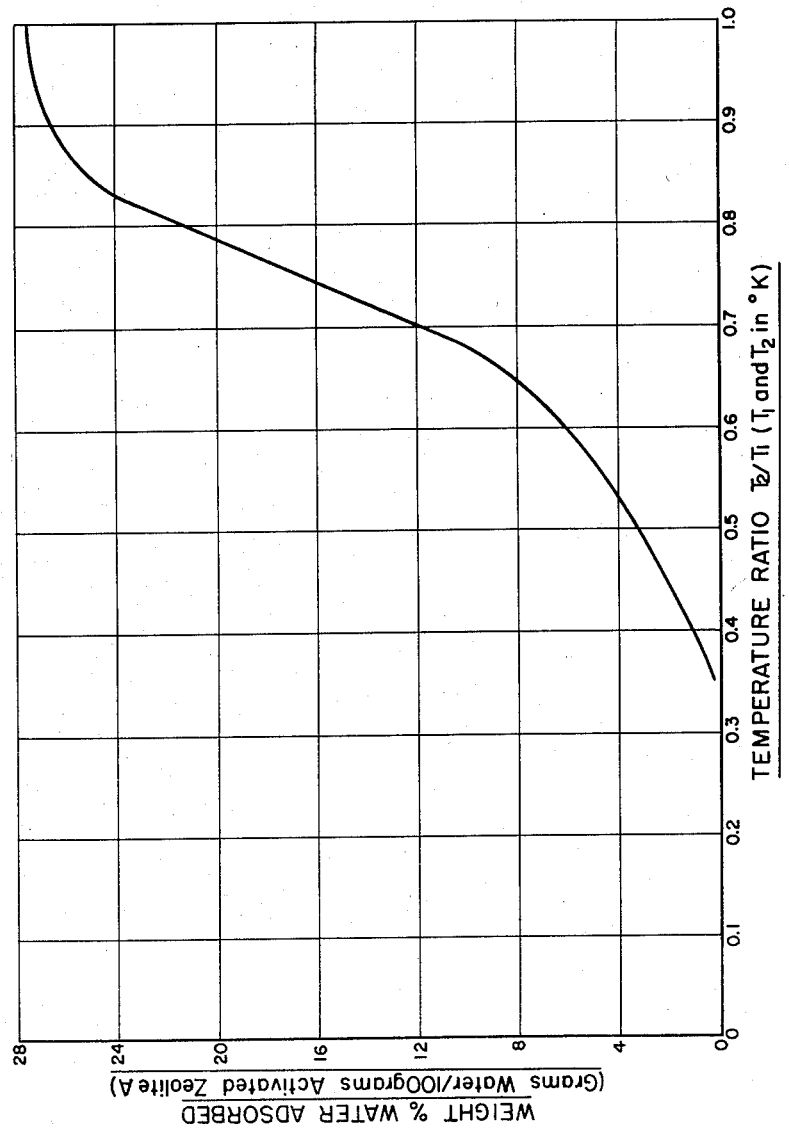
FIG. 1 is a graph showing the amount of water adsorbed versus the temperature ratio $T_2/T_1$ for various cationic forms of zeolite A.
Figure 2:
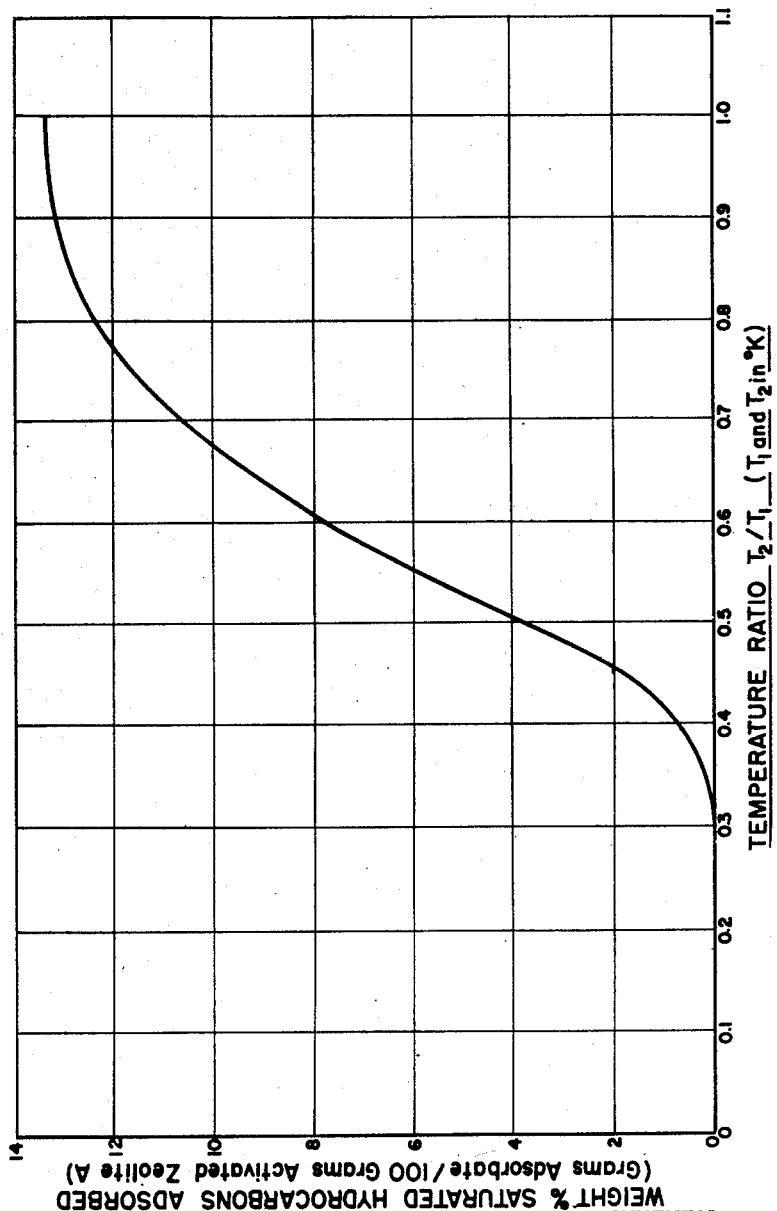
FIG. 2 is a graph showing the amount of adsorbed normal saturated aliphatic hydrocarbons having less than four carbon atoms per molecule, versus the temperature ratio $T_2/T_1$ for various cationic forms of zeolite A.
Figure 3:
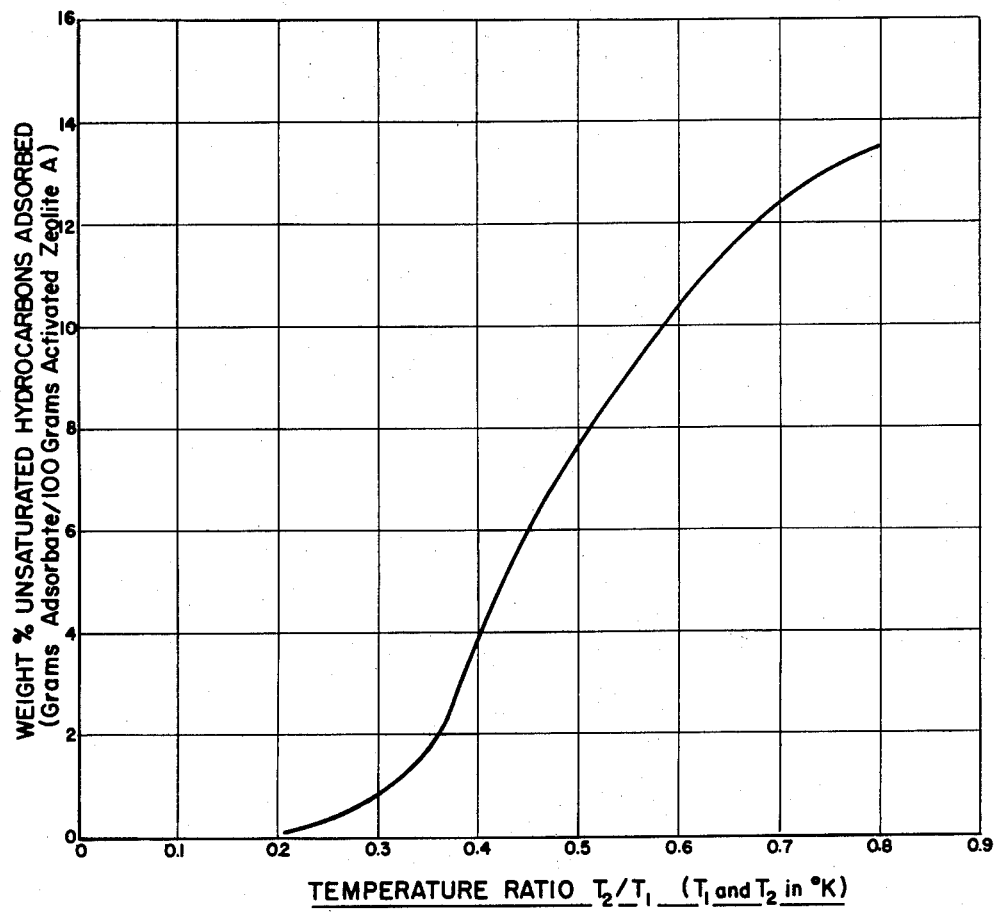
FIGURE 3 is a graph showing the amount of $C_1$-$C_3$ normal unsaturated aliphatic hydrocarbons adsorbed versus the temperature ratio $T_2/T_1$, for various cationic forms of zeolite A.

Certain adsorbents, including zeolite A, which selectively adsorb molecules on the basis of the size and shape of the adsorbate molecule are referred to as molecular sieves. These sieves have a sorption area available on the inside of a large number of uniformly sized pores of molecular dimensions. With such an arrangement molecules of a certain size and shape enter the pores and are adsorbed while larger or differently shaped molecules are excluded. Not all adsorbents behave in the manner of the molecular sieves. Such common adsorbents as charcoal and silica gel, for example, do not exhibit molecular sieve action.

Zeolite A consists basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of the tetrahedra containing aluminum is balanced by the inclusion in the crystal of a cation, for example, an alkali or alkaline earth metal ion. This balance may be expressed by the formula $$Al_2/(Ca, Sr, Ba, Na_2, K_2)=1$$

One cation may be exchanged for another by ion exchange techniques which are described below. The spaces between the tetrahedra are occupied by water molecules prior to dehydration.

Zeolite A may be activated by heating to effect the loss of the water of hydration. The dehydration results in crystals interlaced with channels of molecular dimensions that offer very high surface areas for the adsorption of foreign molecules. These interstitial channels will not accept molecules that have a maximum dimension of the minimum projected cross-section in excess of about 5.5 A. Factors influencing occlusion by the activated zeolite A crystals are the size and polarizing power of the interstitial cation, the polarizability and polarity of the occluded molecules, the dimensions and shape of the sorbed molecule relative to those of the channels, the duration and severity of dehydration and desorption, and the presence of foreign molecules in the interstitial channels.

Although there are a number of cations that may be present in zeolite A it is preferred to formulate or synthesize the sodium form of the crystal since the reactants are readily available and water soluble. The sodium in the sodium form of zeolite A may be easily exchanged for other cations as will be shown below. Essentially the preferred process comprises heating a proper mixture in aqueous solution of the oxides, or of materials whose chemical compositions can be completely represented as mixtures of the oxides, $Na_2O$, $Al_2O_3$, $SiO_2$, and $H_2O$, suitably at a temperature of about 100° C. for periods of time ranging from 15 minutes to 90 hours or longer. The product which crystallizes from the hot mixture is filtered off and washed with distilled water until the effluent wash water in equilibrium with the zeolite has a pH of from about 9 to 12. The material, after activation, is ready for use as a molecular sieve.

Zeolite A may be distinguished from other zeolites and silicates on the basis of its X-ray powder diffraction pattern. The X-ray patterns for several of the ion exchanged forms of zeolite A are described below. Other characteristics that are useful in identifying zeolite A are its composition and density.

The basic formula for all crystalline zeolites where "M" represents a metal and "n" its valence may be represented as follows:

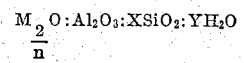

In general a particular crystalline zeolite will have values for X and Y that fall in a definite range. The value X for a particular zeolite will vary somewhat since the aluminum atoms and the silicon atoms both occupy essentially equivalent positions in the lattice. Minor variations in the relative numbers of these atoms do not significantly alter the crystal structure or physical properties of the zeolite. For zeolite A, numerous analyses have shown that an average value for X is about 1.85. The X value falls within the range 1.85±0.5.

The value of Y likewise is not necessarily an invariant for all samples of zeolite A particularly among the various ion exchanged forms of zeolite A. This is true because various exchangeable ions are of different size, and, since there is no major change in the crystal lattice dimensions upon ion exchange, more or less space should be available in the pores of the zeolite A to accomodate water molecules. For instance, sodium zeolite A was partially exchanged with magnesium, and lithium, and the pore volume of these forms, in the activated condition, measured with the following results:

| Ion Exchanged Form of Zeolite A | Percent Na Ions Replaced | Value of Y |
|---|---|---|
| Na | 0 | 5.1 |
| Mg | 75 | 5.8 |
| K | 95 | 4 |
| Ca | 93 | 5 |

The average value for Y thus determined for the fully hydrated sodium zeolite A was 5.1; and in varying conditions of hydration, the value of Y can vary from 5.1 to essentially zero. The maximum value of Y has been found in 75% exchanged magnesium zeolite A, the fully hydrated form of which has a Y value of 5.8. In general an increase in the degree of ion exchange of the magnesium form of zeolite A results in an increase in the Y value. Larger values, up to 6, may be obtained with more fully ion exchanged materials.

In zeolite A synthesized according to the preferred procedure, the ratio $Na_2O/Al_2O_3$ should equal one. But if all of the excess alkali present in the mother liquor is not washed out of the precipitated product, analysis may show a ratio greater than one, and if the washing is carried too far, some sodium may be ion exchanged by hydrogen, and the ratio will drop below one. Thus, a typical analysis for a thoroughly washed sodium zeolite A is $0.99Na_2O:1.0Al_2O_3:1.85SiO_2:5.1H_2O$. The ratio $Na_2O/Al_2O_3$ has varied as much as 23%. The composition for zeolite A lies in the range of $$\frac{M_{\frac{2}{n}}O}{Al_2O_3} = 1.0 \pm 0.2$$

where "M" represents a metal and "n" its valence.

Thus the formula for zeolite A may be written as follows:

$$1.0 \pm 0.2 M_{\frac{2}{n}}O : Al_2O_3 : 1.85 \pm 0.5 SiO_2 : YH_2O$$

In this formula "M" represents a metal, "n" its valence, and "Y" may be any value up to 6 depending on the identity of the metal and the degree of dehydration of the crystals.

The pores of zeolite A are normally filled with water and in this case, the above formula represents their chemical analysis. When other materials as well as water are in the pores of zeolite A, chemical analysis will show a lower value of Y and the presence of other adsorbates. The presence in the pores of non-volatile materials, such as sodium chloride and sodium hydroxide, which are not removable under normal conditions of activation at temperatures of from 100° C. to 650° C. does not significantly alter the crystal lattice or structure of zeolite A although it will of necessity alter the chemical composition.

The apparent density of fully hydrated samples of zeolite A were determined by the flotation of the crystals on liquids of appropriate densities. The technique and liquids used are discussed in an article entitled "Density of Liquid Mixture" appearing in Acta Crystallographica, 1951, vol. 4, page 565. The densities of several such crystals are as follows:

| Form of Zeolite A | Percent of Exchange | Density, g./cc. |
|---|---|---|
| Sodium | 100 | 1.99±0.1 |
| Lithium | 65 | 1.92±0.1 |
| Potassium | 95 | 2.08±0.1 |
| Cesium | 31 | 2.26±0.1 |
| Magnesium | 75 | 2.04±0.1 |
| Calcium | 93 | 2.05±0.1 |
| Thallous | 80 | about 3.36 |

In making the sodium form of zeolite A, representative reactants are silica gel, silicic acid or sodium silicate as a source of silica. Alumina may be obtained from activated alumina, gamma alumina, alpha alumina, alumina trihydrate, or sodium aluminate. Sodium hydroxide may supply the sodium ion and in addition assist in controlling the pH. Preferably the reactants are water soluble. A solution of the reacants in the proper proportions is placed in a container, suitably of metal or glass. The container is closed to prevent loss of water and the reactants heated for the required time. A convenient and preferred procedure for preparing the reactant mixture is to make an aqueous solution containing the sodium aluminate and hydroxide and add this, preferably with agitation, to an aqueous solution of sodium silicate. The system is stirred until homogeneous or until any gel which forms is broken into a nearly homogeneous mix. After this mixing, agitation may be stopped as it is unnecessary to agitate the reacting mass during the formation and crystallization of the zeolite, however, mixing during formation and crystallization has not been found to be detrimental. The initial mixing of ingredients is conveniently done at room temperature but this is not essential.

In the synthesis of zeolite A, it has been found that the composition of the reacting mixture is critical. The crystallizing temperature and the length of time the crystallizing temperature is maintained are important variables in determining the yield of crystalline material. Under some conditions, for example too low a temperature for too short a time, no crystalline materials are produced. Extreme conditions may also result in the production of materials other than zeolite A.

The sodium form of zeolite A has been produced at 100° C., essentially free from contaminating materials, from reacting mixtures whose compositions, expressed as mixtures of the oxides, fall within either of the following ranges.

| | Range 1 | Range 2 |
|---|---|---|
| $SiO_2/Al_2O_3$ | 0.5–1.3 | 1.3–2.5 |
| $Na_2O/SiO_2$ | 1.0–3.0 | 0.8–3.0 |
| $H_2O/Na_2O$ | 35–200 | 35–200 |

When zeolite A has been prepared, mixed with other materials, the X-ray pattern of the mixture can be reproduced by a simple proportional addition of the X-ray patterns of the individual pure components.

Other properties, for instance molecular sieve selectivity, characteristic of zeolite A are present in the properties of the mixture to the extent that zeolite A is part of the mixture.

The adsorbents contemplated herein include not only the sodium form of zeolite A as synthesized above from a sodium-aluminum-silicate-water system with sodium as the exchangeable cation but also crystalline materials obtained from such a zeolite by partial or complete replacement of the sodium ion with other cations. The sodium cations can be replaced at least in part, by other ions. These replacing ions can be classified in the following groups: other monovalent or divalent cations, such as lithium and magnesium; metal ions in Group I of the periodic table such as potassium and silver; Group II metal ions such as calcium and strontium; except barium. The preparation of other cationic metal zeolites is too complex for their use in the present invention.

The spatial arrangement of the aluminum, silicon, and oxygen atoms which make up the basic crystal lattice of the zeolite remains essentially unchanged by partial or complete substitution of the sodium ion by other cations. The X-ray patterns of the ion exchanged forms of the zeolite A show the same principal lines at essesntially the same positions, but there are some differences in the relative intensities of the X-ray lines, due to the ion exchange.

Ion exchange of the sodium form of zeolite A (which for convenience may be represented as Na$_2$A) or other forms of zeolite A may be accomplished by conventional ion exchange methods. A preferred continuous method is to pack zeolite A into a series of vertical columns with suitable supports at the bottom; successively pass through the beds a water solution of a soluble salt of the cation to be introduced into the zeolite; and change the flow from the first bed to the second bed as the zeolite in the first bed becomes ion exchanged to the desired extent.

To obtain hydrogen exchange, a water solution of an acid such as hydrochloric acid is effective as the exchanging solution. For sodium exchange, a water solution of sodium chloride is suitable. Other convenient reagents are: for potassium exchange, a water solution of potassium chloride or dilute potassium hydroxide (pH not over about 12); for lithium, magnesium, calcium, ammonium, nickel, or strontium exchange, water solutions of the chlorides of these elements; for zinc exchange, a water solution of zinc nitrate; and for silver exchange, a silver nitrate solution. While it is more convenient to use water soluble compounds of the exchange cations, other solutions containing the desired cations or hydrated cations may be used.

Among the ways of identifying zeolite A and distinguishing it from other zeolites and other crystalline substances, the X-ray powder diffraction pattern has been found to be a useful tool. In obtaining the X-ray diffraction powder patterns, standard techniques were employed. The radiation was the K$\alpha$ doublet of copper, and a Geiger counter spectrometer with a strip chart pen recorder was used. The peak heights I and the positions as a function of $2\theta$, where $\theta$ is the Bragg angle, were read from the spectrometer chart. From these the relative intensities, $100I/I_0$, where $I_0$ is the intensity of the strongest line or peak, and $d$ (obs), the interplanar spacing in A., corresponding to the recorded lines were calculated.

X-ray powder diffraction data for a sodium zeolite A (Na$_2$A), a 95% exchanged potassium zeolite A (K$_2$A), a 93% exchanged calcium zeolite A (CaA), a 94% exchanged lithium zeolite A (Li$_2$A), a 93% exchanged strontium zeolite A (SrA), and an exchanged thallium zeolite A (TlA) are given in Table A. The table lists the $100I/I_0$ and the $d$ values in A. for the observed line for the different forms of zeolite A. The X-ray patterns indicate a cubic unit cell of $a_0$ of between 12.0 and 12.4 A. In a separate column are listed the sum of the squares of the Miller indices $(h^2+k^2+l^2)$ for a cubic unit cell that corresponds to the observed lines in the X-ray diffraction patterns. The $a_0$ values for each particular zeolite are also tabulated and in another column the estimated errors in reading the position of an X-ray peak on the spectrometer chart appear.

The relative intensities and the positions of the lines are only slightly different for these various ion exchanged forms of zeolite A. The patterns show substantially all of the same lines, and all meet the requirements of a cubic unit cell of approximately the same size. The spatial arrangement of silicon-oxygen-and aluminum atoms, i.e. the arrangement of the AlO$_4$ and SiO$_4$ tetrahedra, are essentially identical in all the forms of zeolite A. The appearance of a few minor lines and the disappearance of others from one form of zeolite A to another as well as slight changes in the intensities and positions of some of the X-ray lines can be attributed to the different sizes and numbers of cations present in the various forms since these differences effect some small expansion or contraction of the crystals.

TABLE A

| $(h^2+k^2+l^2)$ | Na$_2$A | | Li$_2$A | | K$_2$A | | Estimated Error in $d$ value |
|---|---|---|---|---|---|---|---|
| | $d$ | $100I/I_0$ | $d$ | $100I/I_0$ | $d$ | $100I/I_0$ | |
| 1 | 12.29 | 100 | 12.04 | 100 | 12.31 | 100 | ±0.02 |
| 2 | 8.71 | 69 | 8.51 | 72 | 8.71 | 64 | ±0.02 |
| 3 | 7.11 | 35 | 6.96 | 42 | 7.10 | 30 | ±0.01 |
| 4 | | | | | 6.15 | 4 | ±0.01 |
| 5 | 5.51 | 25 | 5.39 | 25 | 5.50 | 10 | ±0.01 |
| 6 | 5.03 | 2 | | | 5.03 | 8 | ±0.01 |
| 8 | 4.36 | 6 | 4.26 | 18 | | | ±0.01 |
| 9 | 4.107 | 36 | 4.02 | 48 | 4.105 | 33 | ±0.004 |
| 10 | | | 3.805 | 4 | 3.895 | 10 | ±0.003 |
| 11 | 3.714 | 53 | 3.633 | 53 | 3.714 | 62 | ±0.003 |
| 12 | | | | | 3.555 | 5 | ±0.003 |
| 13 | 3.417 | 16 | 3.342 | 28 | 3.414 | 34 | ±0.003 |
| 14 | 3.293 | 47 | 3.222 | 49 | 3.292 | 35 | ±0.002 |
| 16 | | | | | 3.078 | 12 | ±0.002 |
| 17 | 2.987 | 55 | 2.923 | 43 | 2.985 | 80 | ±0.002 |
| 18 | 2.904 | 9 | 2.837 | 4 | 2.902 | 27 | ±0.002 |
| 20 | 2.754 | 12 | 2.691 | 4 | 2.753 | 65 | ±0.002 |
| 21 | 2.688 | 4 | 2.628 | 13 | 2.687 | 9 | ±0.002 |
| 22 | 2.626 | 22 | 2.569 | 32 | 2.625 | 18 | ±0.002 |
| 24 | 2.515 | 5 | 2.457 | 7 | 2.514 | 28 | ±0.002 |
| 25 | 2.464 | 4 | 2.408 | 1 | | | ±0.002 |
| 26 | | | 2.363 | 8 | 2.415 | 4 | ±0.002 |
| 27 | 2.371 | 3 | 2.319 | 5 | 2.370 | 9 | ±0.002 |
| 29 | 2.289 | 1 | 2.235 | 3 | 2.287 | 3 | ±0.002 |
| 30 | 2.249 | 3 | 2.199 | 3 | 2.248 | 5 | ±0.002 |
| 32 | 2.177 | 7 | | | 2.177 | 26 | ±0.002 |
| 33 | 2.144 | 10 | 2.097 | 2 | 2.143 | 12 | ±0.001 |
| 34 | 2.113 | 3 | 2.064 | 2 | | | ±0.001 |
| 35 | 2.083 | 4 | | | 2.081 | 5 | ±0.001 |
| 36 | 2.053 | 9 | 2.007 | 20 | 2.053 | 3 | ±0.001 |
| 37 | | | 1.980 | 1 | | | ±0.001 |
| 38 | | | 1.954 | 2 | 1.998 | 4 | ±0.001 |
| 41 | 1.924 | 7 | 1.881 | 8 | 1.922 | 7 | ±0.001 |
| 42 | 1.901 | 4 | 1.859 | 2 | 1.900 | 4 | ±0.001 |
| 44 | 1.858 | 2 | | | 1.857 | 8 | ±0.001 |
| 45 | 1.837 | 3 | 1.795 | 2 | | | ±0.001 |
| 49 | 1.759 | 2 | 1.720 | 3 | | | ±0.001 |
| 50 | 1.743 | 13 | 1.702 | 10 | 1.742 | 12 | ±0.001 |
| 51 | | | 1.686 | 1 | | | ±0.001 |
| 53 | 1.692 | 6 | 1.653 | 8 | 1.691 | 7 | ±0.001 |
| 54 | 1.676 | 2 | | | | | ±0.001 |
| 57 | 1.632 | 4 | 1.593 | 3 | 1.631 | 7 | ±0.001 |
| 59 | 1.604 | 6 | 1.566 | 3 | 1.603 | 6 | ±0.001 |
| 61 | 1.577 | 4 | 1.541 | 5 | 1.576 | 8 | ±0.001 |
| 62 | | | 1.529 | 2 | | | ±0.001 |
| 65 | 1.528 | 2 | 1.492 | 3 | | | ±0.001 |
| 66 | 1.516 | 1 | 1.481 | 2 | | | ±0.001 |
| 67 | | | 1.470 | 2 | | | ±0.001 |
| 68 | | | 1.459 | 2 | 1.493 | 7 | ±0.001 |
| 69 | 1.483 | 3 | 1.449 | 3 | | | ±0.001 |
| 70 | 1.473 | 2 | 1.438 | 1 | | | ±0.001 |
| 72 | | | 1.417 | 4 | | | ±0.001 |
| 74 | 1.432 | 3 | 1.399 | 6 | | | ±0.001 |
| 75 | 1.422 | 2 | | | | | ±0.001 |
| 77 | 1.404 | 5 | | | 1.403 | 4 | ±0.001 |
| 81 | 1.369 | 2 | | | | | ±0.001 |
| 82 | 1.360 | 8 | | | 1.359 | 7 | ±0.001 |
| $a_0$ | 12.32 ±0.02 | | 12.04 ±0.02 | | 12.31 ±0.02 | | |

| $(h^2+k^2+l^2)$ | CaA | | SrA | | Tl$_2$A | | Estimated Error in $d$ value |
|---|---|---|---|---|---|---|---|
| | $d$ | $100I/I_0$ | $d$ | $100I/I_0$ | $d$ | $100I/I_0$ | |
| 1 | 12.24 | 100 | 12.36 | 90 | 12.31 | 13 | ±0.02 |
| 2 | 8.66 | 39 | 8.72 | 66 | 8.71 | 8 | ±0.02 |
| 3 | 7.08 | 32 | | | 7.11 | 10 | ±0.01 |
| 4 | 6.12 | 12 | | | 6.16 | 24 | ±0.01 |
| 5 | 5.48 | 20 | | | | | ±0.01 |
| 6 | 5.00 | 4 | | | | | ±0.01 |
| 8 | | | | | 4.36 | 100 | ±0.01 |
| 9 | 4.08 | 35 | | | 4.11 | 7 | ±0.004 |
| 10 | 3.875 | 2 | | | | | ±0.003 |
| 11 | 3.696 | 34 | 3.714 | 60 | 3.717 | 34 | ±0.003 |
| 12 | 3.539 | 4 | 3.556 | 15 | 3.558 | 18 | ±0.003 |
| 13 | 3.398 | 18 | 3.415 | 21 | 3.418 | 19 | ±0.003 |
| 14 | 3.276 | 38 | 3.292 | 68 | 3.294 | 4 | ±0.002 |
| 16 | | | | | 3.081 | 25 | ±0.002 |
| 17 | 2.972 | 32 | 2.986 | 100 | 2.990 | 22 | ±0.002 |
| 18 | 2.888 | 9 | 2.903 | 38 | 2.906 | 6 | ±0.002 |
| 19 | | | | | 2.828 | 1 | ±0.002 |
| 20 | 2.741 | 7 | 2.753 | 49 | 2.757 | 51 | ±0.002 |
| 21 | 2.676 | 3 | | | | | ±0.002 |
| 22 | 2.614 | 24 | 2.625 | 49 | 2.630 | 11 | ±0.002 |
| 24 | 2.502 | 7 | | | 2.517 | 55 | ±0.002 |

TABLE A—Continued

| $(h^2+k^2+l^2)$ | CaA $d$ | CaA $100I/I_0$ | SrA $d$ | SrA $100I/I_0$ | Tl₂A $d$ | Tl₂A $100I/I_0$ | Estimated Error in $d$ value |
|---|---|---|---|---|---|---|---|
| 25 | 2.451 | 7 | | | 2.466 | 2 | ±0.002 |
| 26 | | | | | 2.416 | 2 | ±0.002 |
| 27 | 2.359 | 3 | | | | | ±0.002 |
| 29 | | | | | 2.291 | 8 | ±0.002 |
| 30 | 2.238 | 3 | | | | | ±0.002 |
| 32 | 2.166 | 8 | | | 2.182 | 19 | ±0.001 |
| 33 | 2.141 | 8 | | | 2.144 | 2 | ±0.001 |
| 34 | 2.103 | 5 | | | 2.114 | 2 | ±0.001 |
| 35 | 2.074 | 2 | | | | | ±0.001 |
| 36 | 2.042 | 4 | | | 2.057 | 11 | ±0.001 |
| 40 | | | | | 1.951 | 10 | ±0.001 |
| 41 | 1.914 | 4 | | | 1.926 | 3 | ±0.091 |
| 42 | 1.891 | 3 | | | | | ±0.001 |
| 44 | | | | | 1.860 | 14 | ±0.001 |
| 45 | | | | | 1.837 | 2 | ±0.001 |
| 46 | | | | | 1.821 | 2 | ±0.001 |
| 48 | | | | | 1.779 | 3 | ±0.001 |
| 50 | 1.733 | 11 | | | 1.743 | 3 | ±0.001 |
| 52 | | | | | 1.710 | 8 | ±0.001 |
| 53 | 1.683 | 4 | | | 1.693 | 3 | ±0.001 |
| 54 | 1.667 | 2 | | | | | ±0.001 |
| 56 | | | | | 1.648 | 9 | ±0.001 |
| 57 | 1.623 | 2 | | | 1.633 | 6 | ±0.001 |
| 58 | 1.608 | 5 | | | | | ±0.002 |
| 61 | 1.569 | 4 | | | 1.578 | 3 | ±0.002 |
| 64 | | | | | 1.541 | 2 | ±0.002 |
| 68 | | | | | 1.495 | 11 | ±0.002 |
| 72 | 1.445 | 2 | | | 1.453 | 5 | ±0.002 |
| 74 | 1.425 | 2 | | | 1.433 | 2 | ±0.002 |
| 75 | 1.416 | 1 | | | | | ±0.002 |
| 76 | | | | | 1.414 | 4 | ±0.002 |
| 77 | 1.397 | 3 | | | 1.406 | 2 | ±0.002 |
| 82 | 1.353 | 5 | | | | | ±0.002 |
| 84 | | | | | 1.346 | 3 | ±0.002 |
| $a_0$ | 12.26 ±0.02 | | 12.32 ±0.02 | | 12.33 ±0.02 | | |

In the above table, particularly with reference to SrA, certain values have not been listed since their calculation was not necessary in the determination of the dimensions of the unit cell. The dimension of the edge of the cubic unit cell of the magnesium zeolite A was obtained from data not tabulated above and is 12.29 A.±0.02 A.

The more significant $d$ values for zeolite A are given in Table B.

TABLE B

*d Value of Reflection in A.*

12.2±0.2
8.6±0.2
7.05±0.15
4.07±0.08
3.68±0.07
3.38±0.06
3.26±0.05
2.96±0.05
2.73±0.05
2.60±0.05

Zeolite A may be defined as a synthetic crystalline metal aluminum-silicate having an X-ray powder diffraction pattern characterized by at least those reflections set forth in Table B.

Occasionally, additional lines not belonging to the pattern for zeolite A, appear in a pattern along with the X-ray lines characteristic of zeolite A. This is an indication that one or more additional crystalline materials are mixed with zeolite A in the sample being tested. Frequently these additional materials can be identified as initial reactants in the synthesis of the zeolite, or as other crystalline substances. When zeolite A is heat treated at temperatures of between 100 and 600° C. in the presence of water vapor or other gases or vapors, the relative intensities of the lines in the X-ray pattern may be appreciably changed from those existing in the unactivated zeolite A patterns. Small changes in line positions may also occur under these conditions. These changes in no way hinder the identification of these X-ray patterns as belonging to zeolite A.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the A lattice are not to exclude those materials which, due to some variable mentioned or otherwise known to those skilled in the art, fail to show all of the lines, or show a few extra ones that are permissible in the cubic system of the A zeolite, or show a slight shift in position of the lines, so as to give a slightly larger or smaller lattice parameter.

The zeolites contemplated herein exhibited adsorptive properties that are unique among known adsorbents. The common adsorbents, like charcoal and silica gel, show adsorption selectivities based primarily on the boiling point or critical temperature of the adsorbate. Activated zeolite A on the other hand exhibits a selectivity based on the size and shape of the adsorbate molecule. Among those adsorbate molecules whose size and shape are such as to permit adsorption by zeolite A, a very strong preference is exhibited toward those that are polar, polarizable, and unsaturated. Another property of zeolite A that contributes to its unique position among adsorbents is that of adsorbing large quantities of adsorbate either at very low pressures, at very low partial pressures, or at very low concentrations. One or a combination of one or more of these three adsorption characteristics or others can make zeolite A useful for numerous gas or liquid separation processes where adsorbents are not now employed. The use of zeolite A permits more efficient and more economical operation of numerous processes now employing other adsorbents.

Common adsorbents like silica gel and charcoal do not exhibit any appreciable molecular sieve action whereas the various forms of zeolite A do. This is shown in the tables following in the specification for typical samples of the adsorbents. In these tables as well as others in the specification the term "Weight percent adsorbed" refers to the percentage increase in the weight of the adsorbent. The adsorbents were activated by heating them at a reduced pressure to remove adsorbed materials. Throughout the specification the activation temperature for zeolite A was 350° C. and the pressure at which it was heated was less than about 0.1 millimeter of mercury absolute unless otherwise specified. Throughout the specification, unless otherwise indicated, the pressure given for each adsorption is the pressure of the adsorbate at the adsorption conditions. An important property of zeolite A is the change in its sieving characteristics, particularly its selectivity, with changes in temperature. At liquid air temperatures, about −196° C., oxygen but no substantial amount of nitrogen is adsorbed. At higher temperatures, about −75° C. or higher, nitrogen is adsorbed in larger quantities than oxygen. This behavior is demonstrated by the following data:

| Adsorbate | Pressure (mm. Hg) | Temp. (° C.) | Weight Percent Adsorbed | Pressure (mm. Hg) | Temp. (° C.) | Weight Percent Adsorbed |
|---|---|---|---|---|---|---|
| $O_2$ | 100 | −196 | 24.8 | 750 | −75 | 4.8 |
| $N_2$ | 700 | −196 | 0.6 | 750 | −75 | 10.6 |

The preferential adsorption of nitrogen from air at −78° C. was also demonstrated in a flow system in which air at −78° C. and atmospheric pressure was passed over a bed of sodium zeolite A pellets with a superficial contact time of 25.6 seconds. The oxygen content of the exit gas rose as high as 89%, and the sorbed gas was as high as 94% nitrogen. With a short contact time of 2 to 7 seconds the first gas emerging from the bed was 100% nitrogen as a result of the more rapid rate of oxygen adsorption on freshly activated zeolite at −78° C. This, however, is a temporary condition which changes as the zeolite A approaches its capacity for oxygen at that temperature.

Potassium zeolite A obtained from other forms of zeolite A by exchange with a water solution of potassium chloride has a small pore size as shown by the fact that of a large number of adsorbates tested only water was adsorbed to any appreciable extent.

The sodium zeolite A, conveniently synthesized from sodium aluminate, sodium silicate and water, has a larger pore size than potassium zeolite A. The activated sodium zeolite A adsorbs water readily and adsorbs in addition somewhat larger molecules.

At about room temperature the sodium zeolite A adsorbs the $C_1$ and $C_2$ members of the straight chain saturated hydrocarbon series but not appreciable amounts of the higher homologs. Typical results are shown below.

| Adsorbate | Temperature (° C.) | Pressure (mm. Hg) | Weight Percent Adsorbed on $Na_2A$ |
|---|---|---|---|
| Methane | 25 | 700 | 1.6 |
| Ethane | 25 | 700 | 7.4 |
| Propane | 25 | 700 | 0.7 |
| Butane | 25 | 132 | 0.9 |
| Octane | 25 | 12 | 0.5 |

In the series of straight chain unsaturated hydrocarbons, the $C_2$ and $C_3$ molecules are adsorbed but the higher homologs are only slightly adsorbed. This is shown in the data below for a typical sodium zeolite A. An exception is butadiene, a doubly unsaturated $C_4$.

| Adsorbate | Temperature (° C.) | Pressure (mm. Hg) | Weight Percent Adsorbed on $Na_2A$ |
|---|---|---|---|
| Ethylene | 25 | 200 | 8.4 |
| Propylene | 25 | 200 | 11.3 |
| Butene-1 | 25 | 200 | 2.3 |
| Butadiene | 25 | 9.0 | 13.7 |

In borderline cases where adsorbate molecules are too large to enter the pore system of the zeolite freely, but are not large enough to be excluded entirely, there is a finite rate of adsorption and the amount adsorbed will vary with time. In general, the recorded data represents the adsorption occurring within the first one or two hours, and for some borderline molecules, further adsorption may be expected during periods of ten to fifteen hours. Washing techniques, different heat treatments and the crystal size of the sodium zeolite A powder can cause very appreciable differences in adsorption rates for the borderline molecules.

The calcium and magnesium exchanged zeolite A have molecular sieve adsorptive properties characteristic of materials with larger pores than exist in sodium zeolite A. These two forms of divalent ion exchanged zeolite A behave quite similarly and adsorb all molecules adsorbed by sodium zeolite A plus some larger molecules. For instance, in addition to adsorbing oxygen at liquid air temperature, nitrogen and krypton are also adsorbed. Typical data for an 85% exchanged calcium zeolite A, prepared from sodium zeolite A with a solution of calcium chloride are given below.

| Adsorbate | Temperature (° C.) | Pressure (mm. Hg) | Weight Percent Adsorbed on CaA |
|---|---|---|---|
| Oxygen | −196 | 100 | 30.7 |
| Nitrogen | −196 | 700 | 23.9 |
| Krypton [1] | −196 | 0.007 | 15.2 |

[1] This data obtained on a 66% Ca exchanged Zeolite A.

The calcium and magnesium forms of zeolite A have a pore size that will permit adsorption of molecules for which the maximum dimension of the minimum projected cross-section is approximately 4.9A. but not larger than about 5.5A. The approximate maximum dimension of the minimum projected cross-section for several molecules is as follows: benzene—5.5, propane—4.9, ethane—4.0, and iso-butane—5.6.

There are numerous other ion exchanged forms of zeolite A such as lithium, ammonium, silver, zinc, nickel, hydrogen and strontium. In general, the divalent ion exchanged materials such as zinc, nickel and strontium zeolite A having a sieving action similar to that of calcium and magnesium zeolite A, and the monovalent ion exchanged materials such as lithium and hydrogen zeolite A behave similarly to sodium zeolite A, although some differences exist.

The molecular sieving characteristics of zeolite A may be influenced by the temperature and pressure at which the adsorbent is activated as shown by oxygen adsorption data for sodium zeolite A.

| Activation Temperature (Pressure 0.01 mm. Hg), ° C. | Weight Percent $O_2$ Adsorbed on $Na_2A$ at −196° C. and 13 mm. Hg Pressure |
|---|---|
| 150 | 0.3 |
| 350 | 20.8 |

The sample of sodium zeolite A activated at the lower temperature does not adsorb oxygen while the sample activated at the higher temperature does. This is true even though both samples adsorb over 24% by weight of water at 25° C. and 24 mm. of Hg water vapor pressure.

Another unique property of zeolite A is its strong preference for polar, polarizable and unsaturated molecules, providing of course that these molecules are of a size and shape permitting them to enter the pore system of the zeolites. This is in contrast to charcoal and silica gel which show a main preference based on the volatility of the adsorbate. The following table compares the adsorptions of water, a polar molecule on charcoal, silica gel and sodium zeolite A. The table illustrates the high capacity the zeolite A has for polar molecules.

| Adsorbate | Pressure (mm. Hg) | Temperature (° C.) | Weight Percent Adsorbed | | |
|---|---|---|---|---|---|
| | | | $Na_2A$ | Charcoal | Silica Gel |
| Water | 0.2 | 25 | 22.1 | 0.1 | 1.6 |

A selectivity for polar, polarizable and unsaturated molecules is not new among adsorbents. Silica gel exhibits some preference for such molecules, but the extent of this selectivity is so much greater with zeolite A that separation processes based upon this selectivity become feasible.

The selectivity for polar, polarizable and unsaturated molecules can be altered appreciably by ion exchange and in addition relative selectivities may change with temperature.

Zeolite A shows a selectivity for adsorbates, provided that they are small enough to enter the porous network of the zeolites, based on the boiling points of the adsorbates as well as on their polarity, polarizability or degree of unsaturation. For instance, hydrogen which has a low boiling point is not strongly adsorbed at room temperature.

A further important characteristic of zeolite A is its property of adsorbing large amounts of adsorbates at low adsorbate pressures, partial pressures or concentrations. This property makes zeolite A uniquely useful in the more complete removal of adsorbable impurities from gas and liquid mixtures. It gives them a relatively high adsorption capacity even when the material being adsorbed from a mixture is present in very low concentrations, and permits the efficient recovery of minor components of mixtures. This characteristic is all the more important since adsorption processes are most frequently used when the desired component is present in low concentrations or low partial pressures. High adsorptions at low pressures or concentrations on zeolite A are illustrated in the following table, along with some comparative data for silica gel and charcoal.

column of powdered crystalline material has given excellent results as has a pelleted form obtained by pressing into pellets a mixture of zeolite A and a suitable bonding agent such as clay.

The present process for separating water from certain vapor mixtures depends upon two related properties of zeolite A with respect to the adsorbed phase. The first property is the relatively high selectivity of the internal surfaces of the crystal toward water, a polar compound, as compared to olefinic and normal saturated aliphatic hydrocarbons containing less than four carbon atoms per molecule, air, nitrogen and hydrogen. As previously discussed and illustrated by the tables, zeolite A is capable of adsorbing all of these compounds, based on a consideration of the zeolite A pore size and critical molecular dimensions of these compounds. That is, the pores of zeolite A are sufficiently large and in fact do receive methane, ethane, propane, ethylene, propylene, air, nitrogen or hydrogen molecules. Furthermore, it is known that zeolite A is strongly selective for olefinic hydrocarbons such as ethylene and propylene.

Based on these considerations, one skilled in the art would not recognize that zeolite A would possess its par-

| Adsorbate | Temperature (° C.) | Pressure (mm. Hg) | Weight Percent Adsorbed | | | | |
|---|---|---|---|---|---|---|---|
| | | | $Na_2A$ | CaA | MgA | Charcoal | Silica Gel |
| $H_2O$ | 25 | 0.02 | 12.5 | 13.7 | | 0.4 | 0.7 |
| | 25 | 0.1 | 21.0 | 20.3 | | | 1.2 |
| | 25 | 4.5 | 25.3 | 27.3 | 39.8 | 2.7 | 11.4 |
| | 25 | $^1 P_0$ | 28.9 | 32.0 | 35.3 | 24.1 | 42.9 |
| $C_2H_4$ | 25 | 10 | 6.8 | | | 3.4 | 1.8 |
| | 25 | 100 | 10.0 | | | 5.9 | 2.4 |
| | 25 | 750 | 10.3 | | | 11.5 | 4.3 |
| $O_2$ | 0 | 50 | 0.1 | | | | |
| | | 600 | 0.8 | | | | |
| $N_2$ | 0 | 50 | 0.7 | | | | |
| | | 600 | 2.0 | | | | |
| $H_2$ | 0 | 600 | 0.0 | | | | |
| $CH_4$ | 0 | 600 | 2.1 | | | | |

$^1 P_0$ = the vapor pressure of water at the temperature given.

The strong adsorption of water by zeolite A at low pressures can be capitalized on to remove water from mixtures with other materials.

The adsorption capacity of adsorbents usually decreases with increasing temperature, and while the adsorption capacity of an adsorbent at a given temperature may be sufficient, the capacity may be wholly unsatisfactory at a higher temperature. With zeolite A a relatively high capacity may be retained at higher temperatures. For instance, adsorption data for water on calcium zeolite A and silica gel at 25° C. and 100° C. are tabulated below. It is seen that the capacity of calcium zeolite A remains high even at 100° C.

| Pressure (mm. Hg) | Weight Percent Adsorbed at 25° C. | | Pressure (mm. Hg) | Weight Percent Adsorbed at 100° C. | |
|---|---|---|---|---|---|
| | Silica Gel | CaA | | Silica Gel | CaA |
| 0.1 | 1.2 | 20.3 | 0.6 | 0.2 | 11.3 |
| 4.5 | 11.4 | 27.3 | 4.5 | 0.6 | 16.9 |
| $P_0$ $^1$ | 42.9 | 32.0 | $^1 P_0$ | 1.5 | 20.5 |

$^1 P_0$ = the vapor pressure of water at 25° C.

Zeolite A may be activated by heating it in either air, a vacuum, or other appropriate gas to temperatures of as high as 600° C. The conditions used for desorption of an adsorbate from zeolite A vary with the adsorbate, but either raising the temperature and reducing the pressure, partial pressure or concentration of the adsorbate in contact with the adsorbent or a combination of these steps is usually employed. Another method is to displace the adsorbate by adsorption of another more strongly held adsorbate.

Zeolite A may be used as an adsorbent for the purposes indicated above in any suitable form. For example, a ticular selectivity for water in preference to the other constituents of the present vapor mixture. Contrary to these expectations, it has been discovered that zeolite A possesses an extremely strong selectivity for water to the substantial exclusion of olefinic and normal saturated aliphatic hydrocarbons having less than four carbon atoms per molecule, air, nitrogen and hydrogen.

Another interrelated property of zeolite A which is utilized by the present invention is the relationship of the boiling point or vapor tension characteristics of an individual fluid or clearly related type of fluid to the capacity of the crystalline zeolite A to adsorb the fluid at a given temperature and pressure. More specifically, it has been discovered that a relationship exists between the amount of fluid adsorbed and the temperature ratio $T_2/T_1$ where $T_1$ is the temperature in degrees Kelvin during adsorption, assuming that the temperature of the fluid and the adsorbent are in equilibrium. $T_2$ is the temperature in degrees Kelvin at which the vapor pressure of the fluid is equal to the partial pressure or vapor tension of the fluid in equilibrium with the zeolite A adsorbent. Stated in another way, $T_2$ is the temperature at which the vapor pressure of the adsorbate is equal to the partial pressure of the adsorbate during adsorption. $T_2$ is actually the dew point of the adsorbate at the adsorption conditions.

This relationship is clearly shown in FIG. 1 which is a plot of the weight percent of water adsorbed versus the temperature ratio $T_2/T_1$ for both monovalent and divalent cationic forms of zeolite A. The following Table C is a summary of the data from which FIG. 1 was prepared, the data having been assembled from tests described in more detail in other parts of the specification. That is, the $T_1$ values for these examples were obtained from the preceding portion of the specification and the $T_2$ values were read from the vapor pressure tables in "Industrial and Engineering Chemistry," vol. 39, page 517, April 1947.

TABLE C

| Ion Form of Zeolite A | Water Tension in mm. Hg | Wt. Percent Water Adsorbed | Temp., °K. | | $T_2/T_1$ |
|---|---|---|---|---|---|
| | | | $T_1$ | $T_2$ | |
| K | 0.1 | 18.0 | 298 | 233 | 0.78 |
| K | 19.0 | 22.3 | 298 | 294 | 0.99 |
| Na | 0.01 | 3.5 | 423 | 215 | 0.51 |
| Na | 0.01 | 0 | 623 | 215 | 0.35 |
| Na | 0.2 | 22.1 | 298 | 240 | 0.81 |
| Na | 0.02 | 12.5 | 298 | 220 | 0.74 |
| Na | 0.1 | 21.0 | 298 | 233 | 0.78 |
| Na | 4.5 | 25.3 | 298 | 273 | 0.92 |
| Na | 23.7 | 28.9 | 298 | 298 | 1.00 |
| Ca | 0.02 | 13.7 | 298 | 220 | 0.74 |
| Ca | 0.1 | 20.3 | 298 | 233 | 0.78 |
| Ca | 4.5 | 27.3 | 298 | 273 | 0.92 |
| Ca | 23.7 | 32.0 | 298 | 298 | 1.00 |
| Ca | 0.6 | 11.3 | 373 | 250 | 0.67 |
| Ca | 4.5 | 16.9 | 373 | 273 | 0.73 |
| Ca | 23.7 | 20.5 | 373 | 298 | 0.80 |
| Mg | 4.5 | 29.8 | 298 | 273 | 0.92 |

An inspection of Table C will reveal that it covers $T_1$ values from 25° C. to 350° C. and adsorbate pressures from 0.01 mm. Hg to 23.7 mm. Hg. It was unexpectedly discovered that water being freely adsorbed exhibits the same temperature ratio $T_2/T_1$ relationship to weight percent adsorbed for all four cationic forms of zeolite A. The same relationship should exist for the remaining cationic forms of zeolite A, since each has very similar adsorptive characteristics to at least one of the tested forms. The present invention utilizes this relationship in combination with the previously discussed water selectivity property of zeolite A to provide a novel process for separating water from a vapor mixture containing at least one member of the group consisting of olefinic and normal saturated aliphatic hydrocarbons containing less than four carbon atoms per molecule, air, nitrogen and hydrogen. In its broadest form, the process consists of contacting the vapor mixture with a bed of at least partially dehydrated crystalline zeolite A adsorbent material. The water-depleted vapor mixture is then discharged from the bed. Such contact is preferably effected under conditions such that the temperature ratio $T_2/T_1$ with respect to the inlet end of the bed and with respect to the water contained in the vapor mixture is between 0.50 and 1.0, where $T_1$ is the adsorption temperature and is less than 873° K. and $T_2$ is the temperature in degrees Kelvin at which water has a vapor pressure equal to its partial pressure in the vapor mixture. The lower limit of 0.50 for the temperature ratio $T_2/T_1$ is fixed by the discovery that below this value there is a smaller percentage change in adsorption capacity per unit change in the temperature ratio. Conversely above 0.50, there is a larger percentage change in adsorption capacity per unit change in the temperature ratio. Stated in another way, if it is desired to obtain a certain incremental adsorbate loading at a specified adsorption temperature with a given feed stream, it would be necessary to increase the pressure of operation by a greater percent if the temperature ratio is below 0.50 than if it is maintained above this value in accordance with the invention. Also, the temperature ratio of 0.50 corresponds to a bed loading of 3.2 weight percent adsorbate, and if the temperature ratio were reduced below this value, a larger adsorption bed would be required with its attendant higher investment and operating expenses.

The upper limit of 1.0 for the temperature ratio should not be exceeded, because if the adsorption temperature is equal to or less than the dew point, water condensation will occur, thereby essentially eliminating the sieving action of the zeolite A adsorbent. The broad upper limit of 873° K. for $T_1$ is due to the fact that above this temperature, the crystal structure of zeolite A will be disrupted or damaged with consequent loss of adsorption capacity and reduction in pore size, thereby fundamentally changing its adsorptive characteristics.

The present adsorption process is most efficiently performed if $T_1$, the adsorption temperature, is less than 616° K. but higher than 233° K. This is for the reason that above such range, the zeolite A crystal structure will be damaged by virtue of the contact with water, thereby resulting in permanent loss of capacity and increase in mass transfer resistance. Below 233° K., relatively economical refrigerants such as Freon-12 cannot be employed, thereby necessitating more expensive refrigeration systems. Also, the mechanical properties of metals deteriorates rapidly below about 233° K., so that special construction materials must be employed for adsorbers operating in this low temperature range. However, the increase in zeolite A adsorptive capacity for water at reduced temperatures justifies the employment of refrigeration down to the 233° K. level.

The present invention also contemplates a process for continuously separating water from a vapor mixture containing at least one member selected from the group consisting of olefinic and normal saturated aliphatic hydrocarbons containing less than four carbon atoms per molecule, air, nitrogen and hydrogen. This continuous process includes two steps, an adsorption stroke and a regeneration stroke. The adsorption stroke is the same as the previously described adsorption where the temperature ratio $T_2/T_1$ is between 0.50 and 1.0, and $T_1$ is less than 873° K. In the regeneration stroke, at least part of the adsorbed water is removed by subjecting the zeolite A adsorbent to conditions such that the temperature ratio $T_2/T_1$ at the end of the regeneration stroke, with respect to the adsorbed water, is less than the temperature ratio at the end of the adsorption stroke. Also, for the broad range the difference in total adsorbate loading between the ends of the adsorption and regeneration strokes is at least 0.02 weight percent for increased efficiency of the overall process. A lower differential adsorbate loading would entail prohibitively large adsorber units. During the regeneration stroke $T_1$ is the regeneration temperature and is less than 873° K., and $T_2$ is the temperature at which the adsorbed water has a vapor pressure equal to the partial pressure of the water over the zeolite A bed at the end of the regeneration. It will be understood by those skilled in the art that at least two adsorbent beds may be provided, with one bed on adsorption stroke and the other bed on regeneration stroke. The respective flows are then periodically switched when the first bed becomes loaded with the adsorbate, so that the latter is placed on regeneration stroke and the second bed is placed on-stream.

The continuous process is most efficiently performed if $T_1$, the adsorption temperature is less than 616° K. but higher than 233° K., for previously stated reasons. Also, for maximum efficiency of the overall process, the difference in adsorbate loading between the ends of the adsorption and regeneration strokes is at least 0.5 weight percent. During the regeneration stroke, $T_1$ is preferably below 616° K. for the previously discussed reasons, and above 283° C. It has been discovered that the required duration of the regeneration stroke is substantially longer if the regeneration is performed below ambient conditions.

It will be understood by those skilled in the art that the temperature ratio may be adjusted by well-known methods, as for example, heating the bed by direct or indirect heat transfer, employing a purge gas, or by drawing a vacuum on the bed during the regeneration stroke. Also, during the regeneration stroke the ratio may be adjusted for favorable operation by varying either or both the temperature and the pressure.

The many advantages of the invention are illustrated by the following examples.

EXAMPLE I

A methane feed stream is provided at 25° C. and 1 atmosphere pressure, and with a water dew point of 0° C. The stream is to be dried by contact with a zeolite A bed at a temperature of 25° C. The adsorbent is to be regenerated by employing the 0° C. dew point feed stream. Using these given conditions, the potential capacity of the bed to adsorb water at the bed inlet section may be determined as follows: The $T_2/T_1$ value during the adsorption stroke is 273/298 or 0.92. This temperature ratio provides a loading of 26.8 weight percent water on the zeolite A adsorbent as determined by a reading of the FIG. 1 graph. The potential capacity of the adsorbent bed inlet end for methane may be determined in a similar manner by using the previously reference vapor pressure table so that $T_2$ is 112° K. and the potential methane capacity is only about 0.8 weight percent. If the desired dew point is —50° C., the adsorption stroke may be terminated when the dew point of the effluent gas rises to this value.

Since the zeolite A adsorbent has an extremely high capacity for moisture, it is not necessary that the bed be completely regenerated. For this reason, the adsorbent bed need only be regenerated to a residual moisture loading of, for example, about 3.2 weight percent. For this value, $T_2/T_1$ is equal to 0.50 and since $T_2$ is 273° K., the $T_1$ regeneration temperature must be 546° K. or 273° C.

EXAMPLE II

An ethylene feed stream is provided at 25° C. and 1 atmosphere pressure and with a water dew point of 0° C. The stream is to be dried by contact with a zeolite A bed at a temperature of 25° C. The adsorbent is to be regenerated by employing the 0° C. dew point feed stream.

Using these given conditions, the potential capacity of the bed to adsorb water at the bed inlet section may be determined as follows: The $T_2/T_1$ value during the adsorption stroke is 273/298 or 0.92. This temperature ratio provides a loading of 26.8 weight percent water on the zeolite A adsorbent as determined by a reading of the FIG. 1 graph. The potential capacity of the adsorbent bed inlet end for ethylene may be determined in a similar manner by using the previously referenced vapor pressure table, so that $T_2$ is 169° K. and the potential ethylene capacity is only about 9 weight percent. If the desired dew point is —40° C., the adsorption stroke may be terminated when the dew point of the effluent gas rises to this value.

For the same reasons as described in conjunction with Example I, the adsorbent bed need only be regenerated to a residual moisture loading of, for example, about 3.5 weight percent. For this value, $T_2/T_1$ is equal to 0.52 and since $T_2$ is 273° K., the $T_1$ regeneration temperature must be 525° K. or 252° C.

Figure 4:
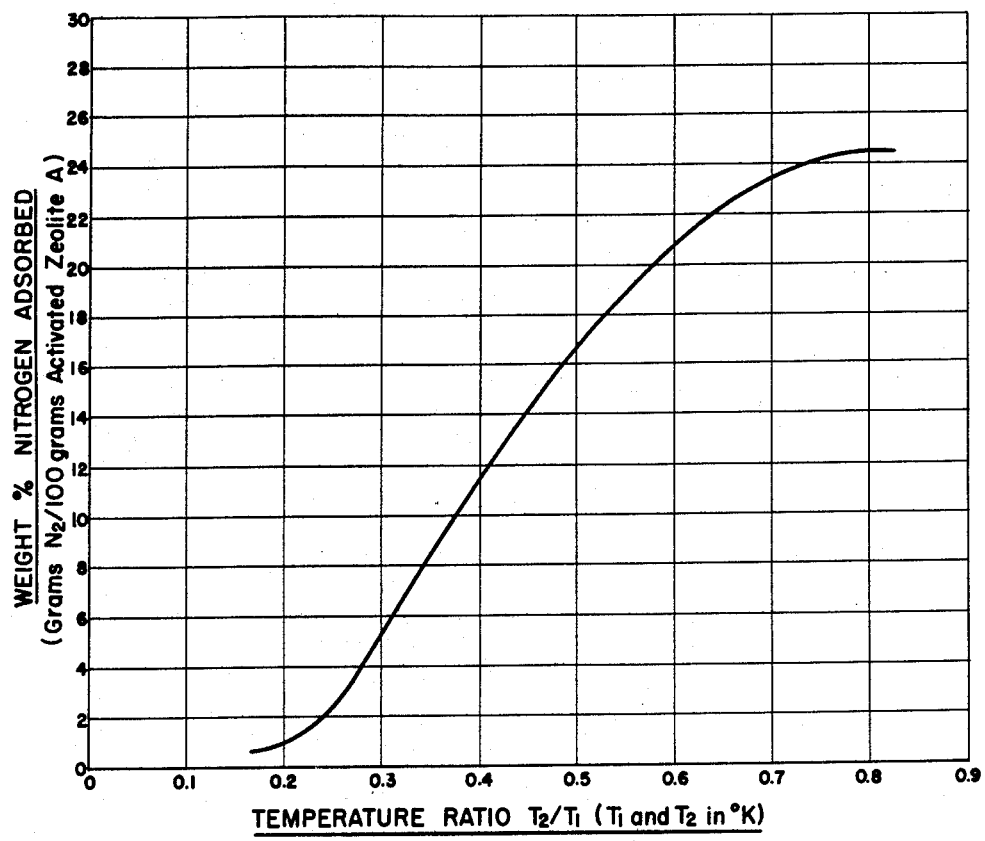
FIGURE 4 is a graph showing the amount of nitrogen adsorbed versus the temperature ratio $T_2/T_1$, for various cationic forms of zeolite A.

If the inlet vapor mixture were to contain nitrogen, the potential capacity of the zeolite A adsorbent for this constituent could be similarly determined by reference to the vapor pressure tables and FIG. 4. Also, the potential capacity for air and hydrogen may be obtained in an analogous manner.

Although the preferred embodiments have been described in detail, it is contemplated that modifications of the process may be made and that some features may be employed without others, all within the spirit and scope of the invention as set forth herein.

This is a continuation-in-part application of copending application Serial No. 400,385, filed December 24, 1953, in the name of R. M. Milton, now abandoned.

What is claimed is:

1. A process for separating water from a vapor mixture containing water and at least one olefinic hydrocarbon having less than four carbon atoms per molecule, which comprises contacting said vapor mixture with a bed of at least partially dehydrated crystalline zeolite A adsorbent material having pores sufficiently large to receive the olefin, and thereafter discharging the water-depleted vapor stream from said bed.

2. A process for separating water from a vapor mixture containing water and ethylene, which comprises contacting said vapor mixture with a bed of at least partially dehydrated crystalline zeolite A adsorbent material having pores sufficiently large to receive ethylene, and thereafter discharging the water-depleted vapor stream from said bed.

3. A process for separating water from a vapor mixture containing water and propylene, which comprises contacting said vapor mixture with a bed of at least partially dehydrated crystalline zeolite A adsorbent material having pores sufficiently large to receive propylene, and thereafter discharging the water-depleted vapor stream from said bed.

References Cited in the file of this patent
UNITED STATES PATENTS

| | | |
|---|---|---|
| 1,813,174 | Lamb | July 7, 1931 |
| 2,988,503 | Milton et al. | June 13, 1961 |
| 3,024,867 | Milton | Mar. 13, 1962 |
| 3,024,868 | Milton | Mar. 13, 1962 |

FOREIGN PATENTS

| | | |
|---|---|---|
| 555,482 | Canada | Apr. 1, 1958 |

OTHER REFERENCES

"The Hydrothermal Chemistry of Silicates, Part I," by Barrer et al., Journal of the Chemical Society, 1951, pp. 1267–1278.

"Separation of Mixtures Using Zeolites as Molecular Sieves, Part I, Three Classes of Molecular Sieve Zeolite"; J. Soc. Chem. Ind., vol. 64, May 1945, pages 130, 131.

"Examine These Ways to Use Selective Adsorption," Petroleum Refiner, vol. 36, No. 7, July 1957, pages 136–140.